(12) United States Patent
Yang

(10) Patent No.: US 12,130,716 B2
(45) Date of Patent: Oct. 29, 2024

(54) MULTI-PATH FAILOVER GROUP MANAGEMENT METHOD, SYSTEM, STORAGE MEDIUM AND SERVER

(71) Applicant: INSPUR SUZHOU INTELLIGENT TECHNOLOGY CO., LTD., Jiangsu (CN)

(72) Inventor: Feihu Yang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/260,607

(22) PCT Filed: Oct. 29, 2021

(86) PCT No.: PCT/CN2021/127506
§ 371 (c)(1),
(2) Date: Jul. 6, 2023

(87) PCT Pub. No.: WO2023/005037
PCT Pub. Date: Feb. 2, 2023

(65) Prior Publication Data
US 2024/0061755 A1    Feb. 22, 2024

(30) Foreign Application Priority Data
Jul. 27, 2021  (CN) .......................... 202110848216.3

(51) Int. Cl.
*G06F 11/20*     (2006.01)
*G06F 11/07*     (2006.01)
*G06F 11/14*     (2006.01)

(52) U.S. Cl.
CPC ...... *G06F 11/2025* (2013.01); *G06F 11/0793* (2013.01); *G06F 11/1423* (2013.01)

(58) Field of Classification Search
CPC ............. G06F 11/2025; G06F 11/0793; G06F 11/1423
See application file for complete search history.

(56) References Cited

U.S. PATENT DOCUMENTS 9,176,902 B1 * 11/2015 Long ..................... G06F 3/0635
2012/0278642 A1 * 11/2012 Sarkar .................. G06F 3/0689
713/323

(Continued)

FOREIGN PATENT DOCUMENTS

CN    104412228 A    3/2015
CN    104917624 A    9/2015

(Continued)

OTHER PUBLICATIONS

International Search Report and Written Opinion for PCT/CN2021/127506 (Apr. 26, 2022).

(Continued)

*Primary Examiner* — Jigar P Patel
(74) *Attorney, Agent, or Firm* — Merchant & Gould P.C.

(57) ABSTRACT

The disclosure provides a multi-path failover group management method, which includes: acquiring Small Computer System Interface (SCSI) address information of a physical volume, and determining physical link information in the SCSI address information; determining target port group information of a storage to which the physical volume belongs; determining whether port group information corresponding to a storage array subscript value is null; when the port group information is null, creating first subscript port group information corresponding to the storage array subscript value, creating a failover group node according to the physical link information, and adding the physical volume to the failover group node; when the port group information is not null, determining whether the port group information is consistent with the target port group infor- (Continued)

mation; and when the port group information is inconsistent with the target port group information, updating the storage array subscript value and reselecting appropriate port group information.

16 Claims, 1 Drawing Sheet

(56) References Cited

U.S. PATENT DOCUMENTS

| | | | |
|---|---|---|---|
| 2015/0121134 A1 | 4/2015 | Wipfel et al. | |
| 2015/0262632 A1* | 9/2015 | Shelton | G06F 12/0684 711/103 |
| 2019/0332308 A1 | 10/2019 | Feng et al. | |
| 2019/0354302 A1* | 11/2019 | Enz | G06F 3/061 |
| 2021/0099520 A1* | 4/2021 | Anchi | H04L 41/0246 |

FOREIGN PATENT DOCUMENTS

| | | |
|---|---|---|
| CN | 111858122 A | 10/2020 |
| CN | 111901245 A | 11/2020 |
| CN | 113300953 A | 8/2021 |

OTHER PUBLICATIONS

Search Report for Chinese Patent Application No. 2021108482163 (Aug. 25, 2021).
Search Report for Chinese Patent Application No. 2021108482163 (Sep. 12, 2021).

* cited by examiner

MULTI-PATH FAILOVER GROUP MANAGEMENT METHOD, SYSTEM, STORAGE MEDIUM AND SERVER

CROSS-REFERENCE TO RELATED APPLICATION

The present application is a National Stage Application of PCT International Application No. PCT/CN2021/127506 filed on Oct. 29, 2021, which claims priority to Chinese Patent Application No. 202110848216.3, filed to the China National Intellectual Property Administration on Jul. 27, 2021 and entitled "Multi-Path Failover Group Management Method, System and Related Device", the disclosure of which is hereby incorporated by reference in its entirety.

TECHNICAL FIELD

The disclosure relates to the field of servers, in particular to a multi-path failover group management method, a system, a storage medium, and a server.

BACKGROUND

An Input/Output (I/O) channel usually contains an initial port, a fabric port, a destination port, and a Logical Unit Number (LUN). Each different permutation of the I/O channel is considered a separate path.

Storage multi-path refers to multiple transport layer physical connections between a host and a storage device, which provides higher availability and performance advantages for a network storage system.

A failover group stores information of all physical volumes reported by the same physical path. In a scenario where a physical link fails, then all physical volumes belonging to this physical link need to perform a physical link switch operation to avoid upper-layer service interruption.

In traditional failover group management, in a scenario where multiple storages map the volumes to the same host, the failover may be switched to a false physical link, resulting in upper-layer service interruption.

SUMMARY

The disclosure aims to provide a multi-path failover group management method and system, a non-transitory storage medium, and a server, which may improve the efficiency of path switching when multiple paths fail.

In order to solve the above technical problem, the disclosure provides a multi-path failover group management method, and the specific following technical solution is as follows.

At S1, SCSI address information of a physical volume is acquired, and physical link information in the SCSI address information is determined.

At S2, target port group information of a storage to which the physical volume belongs is determined.

At S3, it is determined whether port group information corresponding to a storage array subscript value is null; when the port group information corresponding to the storage array subscript value is null, S4 is entered; and when the port group information corresponding to the storage array subscript value is not null, S5 is entered.

At S4, first subscript port group information corresponding to the storage array subscript value is created, a failover group node is created according to the physical link information, and the physical volume is added to the failover group node.

At S5, it is determined whether the port group information corresponding to the storage array subscript value is consistent with the target port group information; and when the port group information corresponding to the storage array subscript value is inconsistent with the target port group information, S6 is entered.

At S6, the storage array subscript value is updated and S3 is returned.

In some embodiments, whether the port group information corresponding to the storage array subscript value is inconsistent with the target port group information further includes the following operations.

A failover group linked list corresponding to the storage array subscript value is looked up.

It is determined whether a first target failover group node whose target physical link information is consistent with the physical link information exists in the failover group linked list.

When the first target failover group node whose target physical link information is consistent with the physical link information exists in the failover group linked list, the physical volume is added to the first target failover group node.

In some embodiments, when the first target failover group node whose target physical link information is consistent with the physical link information does not exist in the failover group linked list, the method further includes the following operations.

A second target failover group node is created according to the physical link information, and the second target failover group node is added to the failover group linked list.

The physical volume is added to the second target failover group node.

In some embodiments, before the physical volume is added to the first target failover group node, the method further includes the following operations.

It is determined whether the first target failover group node is active.

When the first target failover group node is not active, the first target failover group node is modified to be active, and the physical volume is added to the second target failover group node.

In some embodiments, after the failover group node is created according to the physical link information, the method further includes the following operation.

The failover group node is added to the failover group linked list corresponding to the storage array subscript value.

In some embodiments, the operation that the storage array subscript value is updated and S3 is returned includes the following operation.

One is added to the storage array subscript value as the updated storage array subscript value, and S3 is returned.

The disclosure further provides a multi-path failover group management system, which includes an acquisition component, an information determination component, a first determination component, a port group creation component, a second determination component, and an update component.

The acquisition component is configured to acquire SCSI address information of a physical volume, and determine physical link information in the SCSI address information.

The information determination component is configured to determine target port group information of a storage to which the physical volume belongs.

The first determination component is configured to determine whether port group information corresponding to a storage array subscript value is null; enter the port group creation component when the port group information corresponding to the storage array subscript value is null; and enter the second determination component when the port group information corresponding to the storage array subscript value is not null.

The port group creation component is configured to create first subscript port group information corresponding to the storage array subscript value, create a failover group node according to the physical link information, and add the physical volume to the failover group node.

The second determination component is configured to determine whether the port group information corresponding to the storage array subscript value is consistent with the target port group information; and enter the update component when the port group information corresponding to the storage array subscript value is inconsistent with the target port group information.

The update component is configured to update the storage array subscript value and return the first determination component.

In some embodiments, the update component is configured to add one to the storage array subscript value as the updated storage array subscript value and return the first determination component.

The disclosure further provides a non-transitory storage medium, on which a computer program is stored, and the computer program, when executed by a processor, implements the steps of the method as described above.

The disclosure further provides a server, which includes a memory and a processor. A computer program is stored in the memory, and the processor calls the computer program in the memory to implement the steps of the method as described above.

The multi-path failover group management method provided by the disclosure includes that: S1: the SCSI address information of the physical volume is acquired, and the physical link information in the SCSI address information is determined; S2: the target port group information of the storage to which the physical volume belongs is determined; S3: it is determined whether the port group information corresponding to the storage array subscript value is null; when the port group information corresponding to the storage array subscript value is null, S4 is entered; and when the port group information corresponding to the storage array subscript value is not null, S5 is entered; S4: the first subscript port group information corresponding to the storage array subscript value is created, the failover group node is created according to the physical link information, and the physical volume is added to the failover group node; S5: it is determined whether the port group information corresponding to the storage array subscript value is consistent with the target port group information; and when the port group information corresponding to the storage array subscript value is inconsistent with the target port group information, S6 is entered; and S6: the storage array subscript value is updated and S3 is returned.

The disclosure uses the port group information to reduce the scope of the failover group from a large ring composed of all physical paths to a small ring composed of a single path in units of storage. Compared with traditional failover group management, failover query reduces the scope of failover group query from the physical links of all storages to the physical link of the single storage, which realizes the management of the multi-path failover group simply and efficiently, greatly improves the multi-path fault switching efficiency and improves the user experience.

The disclosure further provides a multi-path failover group management system, a non-transitory storage medium, and a server, which have the above beneficial effects and will not be elaborated herein.

BRIEF DESCRIPTION OF THE DRAWINGS

In order to more clearly illustrate the embodiments of the disclosure or the technical solutions in the related art, the drawings used in the description of the embodiments or the related art will be briefly described below. It is apparent that the drawings described below are only some embodiments of the disclosure. Other drawings may further be obtained by those of ordinary skill in the art according to these drawings without creative efforts.

DETAILED DESCRIPTION OF THE EMBODIMENTS

In order to make the objects, technical solutions and advantages of the embodiments of the disclosure clearer, the technical solutions in the embodiments of the disclosure will be clearly and completely described in conjunction with the drawings in the embodiments of the disclosure. It is apparent that the described embodiments are only a part of the embodiments of the disclosure, and not all of them. All other embodiments obtained by those of ordinary skill in the art based on the embodiments of the disclosure without creative efforts are within the scope of protection of the disclosure.

Figure 1:
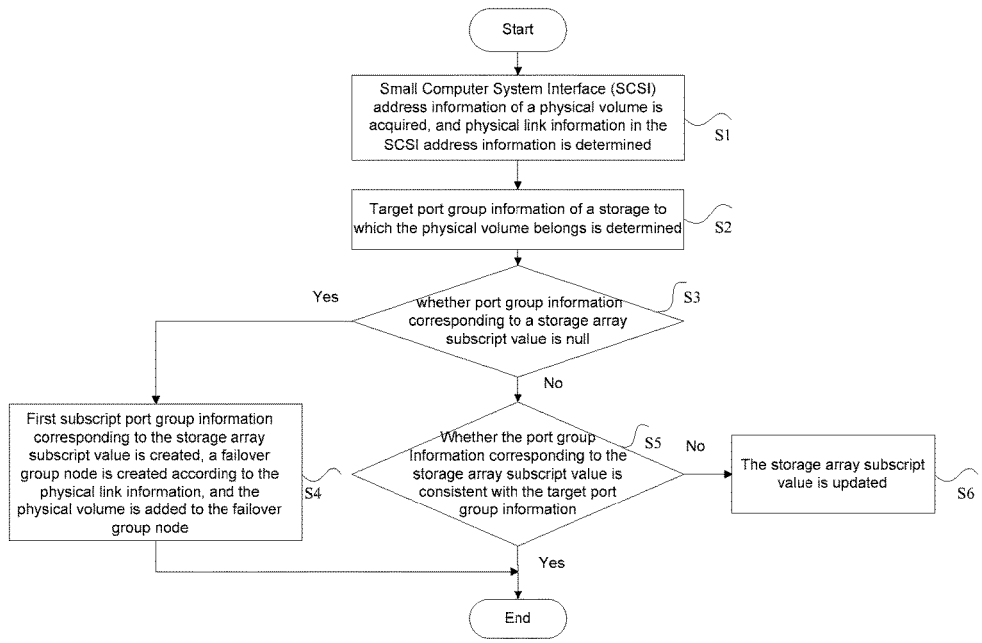
FIG. 1 is a flowchart of a multi-path failover group management method according to an embodiment of the disclosure.

Referring to FIG. 1, FIG. 1 is a flowchart of a multi-path failover group management method according to an embodiment of the disclosure. The method includes the following operations.

Storage multi-path refers to multiple transport layer physical connections between a host and a storage device, which provides higher availability and performance advantages for a network storage system. High availability is reflected in that: if any path between the host and the storage device fails, an I/O request may be sent through other paths. Data access interruption between the host and the storage device due to a single point of failure is avoided. The performance advantage of high throughput is reflected in that: the I/O request from the host to the storage device may be concurrently sent through multiple paths at the same time, which improves the I/O throughput of data access of the host.

A failover group stores information of all physical volumes reported by the same physical path. In a scenario where a physical link fails, then all physical volumes belonging to this physical link need to perform a physical link switch operation to avoid upper-layer service interruption. An Input/Output (I/O) channel usually contains an initial port, a fabric port, a destination port, and a Logical Unit Number (LUN). Each different permutation of the I/O channel is considered a separate path. For example, in a high availability scenario, each node has two Host Bus Adapter (HBA) ports. The two ports are connected to two different switch ports respectively, then to two destination ports of a background storage, and then to the LUN. It is apparent that, at this time, from a point of view of an operating system, there are 8 paths to access the LUN (2 HBA ports*2 switch ports*2 destination ports*1 LUN=8 paths).

In traditional failover group management, whether the failover group (Host: Channel: Target) to which the physical volume belongs exists is queried first, if not, the failover group (Host: Channel: Target) is created and added to a failover group linked list, and finally the physical volume is added to the corresponding failover group. According to the traditional management method, in a scenario where multiple storages map the volumes to the same host, the failover may be switched to a false physical link, resulting in upper-layer service interruption.

At S1, SCSI address information of a physical volume is acquired, and physical link information in the SCSI address information is determined.

This step needs to acquire the SCSI address information of the physical volume, and the SCSI address information contains the physical link information. The physical link information is Host: Channel: Target information, also known as H: C: T information.

At S2, target port group information of a storage to which the physical volume belongs is determined.

This step needs to determine the target port group information of the storage of the physical volume, at this time, the corresponding target port group information may be acquired according to a connection port of the physical volume.

At S3, it is determined whether port group information corresponding to a storage array subscript value is null; when the port group information corresponding to the storage array subscript value is null, S4 is entered; and when the port group information corresponding to the storage array subscript value is not null, S5 is entered.

The storage array subscript value is configured to find the corresponding port group information, and an initial value thereof is usually zero or one. Of course, other initial values of the storage array subscript value may be set by those skilled in the art independently, which is not limited herein. This step aims to determine whether the port group information corresponding to the initial value of the storage array subscript value is null.

At S4, first subscript port group information corresponding to the storage array subscript value is created, a failover group node is created according to the physical link information, and the physical volume is added to the failover group node.

when the port group information corresponding to the storage array subscript value is null, the first subscript port group information corresponding to whether the port group information corresponding to the storage array subscript value is null is created at this time, the SCSI address information in the physical volume is used to create the corresponding failover group node, and the physical volume is added to the failover group node. In addition, the failover group node may also be added to a failover group linked list corresponding to the storage array subscript value.

At S5, it is determined whether the port group information corresponding to the storage array subscript value is consistent with the target port group information; and when the port group information corresponding to the storage array subscript value is inconsistent with the target port group information, S6 is entered.

At S6, the storage array subscript value is updated and S3 is returned.

When the port group information corresponding to the storage array subscript value is not null, it indicates that the port group information corresponding to the storage array subscript value exists. At this time, it may be determined whether the two pieces of port group information is consistent, that is, whether the port group information corresponding to the storage array subscript value is consistent with the target port group information, if not, the storage array subscript value may be updated, S3 is returned, and the above determination process is performed again until the physical volume is added to the corresponding failover group node.

No specific limits are made on how to update the storage array subscript value. One may be added to the storage array subscript value as the updated storage array subscript value, and S3 is returned. Two or other positive integers may also be added at a time, all of which may be set by those skilled in the art independently and are not specifically limited herein.

It can be seen that the failover group node to which the physical volume is added finally may be an existing failover group node or a new failover group node.

According to the embodiment of the disclosure, the port group information is used to reduce the scope of the failover group from a large ring composed of all physical paths to a small ring composed of a single path in units of storage. Compared with traditional failover group management, failover query reduces the scope of failover group query from the physical links of all storages to the physical link of the single storage, which realizes the management of the multi-path failover group simply and efficiently, greatly improves the multi-path fault switching efficiency and improves the user experience.

Based on the above embodiment, in some embodiments, when the port group information corresponding to the storage array subscript value is inconsistent with the target port group information, the method may further include the following operations.

At S201, the failover group linked list corresponding to the storage array subscript value is looked up.

At S202, it is determined whether a first target failover group node whose target physical link information is consistent with the physical link information exists in the failover group linked list; and when the first target failover group node whose target physical link information is consistent with the physical link information exists in the failover group linked list, S203 is entered.

At S203, the physical volume is added to the first target failover group node.

Although the port group information corresponding to the storage array subscript value exists at this time, whether the port group information corresponding to the subscript value of the physical storage array is inconsistent with the target port group information substantially, at this time, the failover group linked list corresponding to the storage array subscript value may be looked up. It is detected whether the first target failover group node whose target physical link information is consistent with the physical volume exists in the failover group linked list, if so, the physical volume is directly added to the first target failover group node, and if not, a second target failover group node is created according to the physical link information, the second target failover group node is added to the failover group linked list, and then the physical volume is added to the second target failover group node.

That is, the physical volume needs to be added to the failover group node finally.

Based on the above embodiment, In some embodiments, before the physical volume is added to the first target failover group node, state detection may also be performed on the failover group node, which includes the following specific steps.

At S301, it is determined whether the first target failover group node is active; and when the first target failover group node is not active, S302 is entered.

At S302, the first target failover group node is modified to be active, and the physical volume is added to the second target failover group node.

That is, the reason for determining whether the first target failover group node is active is that the state of the failover group may be deleted or otherwise inactive, it is ensured that the first target failover group node is active first before adding the physical volume to the second target failover group node.

Of course, when the first target failover group node is active, the physical volume is directly added to the second target failover group node.

The embodiment is not only for the first target failover group node, but also for all existing and new failover group nodes. That is, state detection is performed on the failover group node before the physical volume is added, so as to avoid the failure in adding a physical disk.

A specific implementation process of the disclosure is described below.

At S1, the SCSI address information of the physical volume and the physical link information therein are acquired, that is, Host: Channel: Target information, that is, H: C: T information.

At S2, the target port group information of the storage to which the physical volume belongs is acquired through the physical volume.

At S3, the storage array subscript value is set to i, and i=0.

At S4, it is determined whether the target port group information of the storage [i] is null; when the target port group information of the storage [i] is null, it indicates that the failover group information is established for the first time, S5 is skipped, otherwise S8 is skipped.

At S5, the target port group information of the storage is acquired by using the physical volume, and the target port group information of the storage [i] is created.

At S6, the failover group node is created by using the H:C:T information in the SCSI address information of the physical volume.

At S7, the failover group node is added to the failover group linked list of the storage [i].

At S8, it is determined whether the target port group information of the storage [i] is consistent with the target port group information acquired by the physical disk; when the target port group information of the storage [i] is consistent with the target port group information acquired by the physical disk, it indicates that the physical volume needs to be placed under the failover group corresponding to the storage [i] for management, S9 is skipped, otherwise S12 is skipped.

At S9, the failover group linked list of the storage [i] is looked up.

At S10, it is determined whether the failover group node whose H: C: T information is consistent with the H: C: T information in the SCSI address information of the physical disk exists in the node of the failover group linked list of the storage [i], if not, it indicates that the failover group is not established, S11 is skipped, otherwise S13 is skipped.

At S11, the H: C: T information in the SCSI address information of the physical volume is used to create the failover group node.

At S12, one is added to the storage array subscript value i.

At S13, it is determined whether the state of the failover group is deleted, when it is deleted, S15 is skipped, otherwise S16 is skipped.

At S14, the failover group node is added to the failover group linked list of the storage [i]. At S15, the state of the failover group is modified to be active.

At S16, the matched failover group node is added to the physical disk and the process ends. At S17, the new failover group node is added to the physical disk and the process ends.

A multi-path failover group management system provided by the embodiments of the disclosure is described below, and the management system described below and the multi-path failover group management method described above may be referred to each other.

Figure 2:
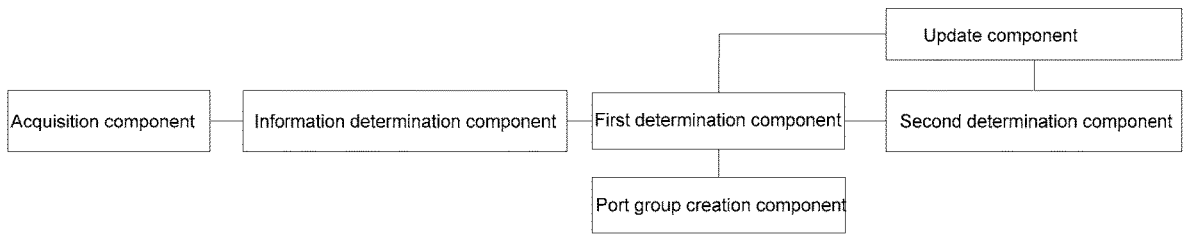
FIG. 2 is a schematic structural diagram of a multi-path failover group management system according to an embodiment of the disclosure.

Referring to FIG. 2, FIG. 2 is a schematic structural diagram of a multi-path failover group management system according to an embodiment of the disclosure. The disclosure also provides a multi-path failover group management system, which includes an acquisition component, an information determination component, a first determination component, a port group creation component, a second determination component, and an update component.

The acquisition component is configured to acquire SCSI address information of a physical volume, and determine physical link information in the SCSI address information.

The information determination component is configured to determine target port group information of a storage to which the physical volume belongs.

The first determination component is configured to determine whether port group information corresponding to a storage array subscript value is null; enter the port group creation component if the port group information corresponding to the storage array subscript value is null; and enter the second determination component if the port group information corresponding to the storage array subscript value is not null.

The port group creation component is configured to create first subscript port group information corresponding to the storage array subscript value, create a failover group node according to the physical link information, and add the physical volume to the failover group node.

The second determination component is configured to determine whether the port group information corresponding to the storage array subscript value is consistent with the target port group information; and enter the update component when the port group information corresponding to the storage array subscript value is inconsistent with the target port group information.

The update component is configured to update the storage array subscript value and return the first determination component.

Based on the above embodiment, in some embodiments, the multi-path failover group management system further includes a node creation component.

The node creation component is configured to create a second target failover group node according to the physical link information, and add the second target failover group node to a failover group linked list; and add the physical volume to the second target failover group node.

Based on the above embodiment, in some embodiments, the multi-path failover group management system further includes a node detection component.

The node detection component is configured to determine whether the first target failover group node is active; modify, when the first target failover group node is not active, the first target failover group node to be active, and add the physical volume to the second target failover group node.

Based on the above embodiment, in some embodiments, the multi-path failover group management system further includes a node addition component.

The node addition component is configured to add the failover group node to the failover group linked list corresponding to the storage array subscript value.

Based on the above embodiment, in some embodiments, the update component is configured to add one to the storage array subscript value as the updated storage array subscript value and return the first determination component.

The embodiments of the disclosure also provide a non-transitory storage medium, on which a computer program is stored. The computer program, when executed by a processor, implements the steps provided in the embodiments. The storage medium may include: various media capable of storing program codes such as a U disk, a mobile hard disk, a Read-Only Memory (ROM), a Random Access Memory (RAM), a magnetic disk, or an optical disk.

The disclosure also provides a server, which may include a memory and a processor. A computer program is stored in the memory, and the processor calls the computer program in the memory to implement the steps provided in the embodiments. Of course, the server may also include various network interfaces, power supplies, and other components.

The various embodiments in the present specification are described in a progressive manner, and each embodiment focuses on differences from other embodiments, and the same similar parts between the various embodiments can be referred to each other. For the system provided by the embodiment, since it corresponds to the method disclosed in the embodiment, the description is relatively simple, and the relevant parts can be referred to the method part.

The principles and implementation modes of the disclosure are described herein using specific examples, the foregoing description of the embodiments are only used to help the understanding of the method and core concept of the disclosure. It is to be noted that a number of improvements and modifications may be also made to the disclosure by those of ordinary skill in the art without departing from the principle of the disclosure, and all fall within the scope of protection of the claims of the disclosure.

It is also to be noted that relational terms "first", "second" and the like in the specification are adopted only to distinguish one entity or operation from another entity or operation and not always to require or imply existence of any such practical relationship or sequence between the entities or operations. Furthermore, terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The invention claimed is:

1. A multi-path failover group management method, comprising:
    S1: acquiring Small Computer System Interface (SCSI) address information of a physical volume, and determining physical link information in the SCSI address information;
    S2: determining target port group information of a storage to which the physical volume belongs;
    S3: determining whether port group information corresponding to a storage array subscript value is null; when the port group information corresponding to the storage array subscript value is null, entering S4; and when the port group information corresponding to the storage array subscript value is not null, entering S5;
    S4: creating first subscript port group information corresponding to the storage array subscript value, creating a failover group node according to the physical link information, and adding the physical volume to the failover group node;
    S5: determining whether the port group information corresponding to the storage array subscript value is consistent with the target port group information; and when the port group information corresponding to the storage array subscript value is inconsistent with the target port group information, entering S6; and
    S6: updating the storage array subscript value and returning S3;
    wherein when the first target failover group node whose target physical link information is consistent with the physical link information does not exist in the failover group linked list, the method comprises:
    creating a second target failover group node according to the physical link information, and adding the second target failover group node to the failover group linked list; and
    adding the physical volume to the second target failover group node;
    wherein before adding the physical volume to the first target failover group node, the method comprises:
    determining whether the first target failover group node is active; and
    when the first target failover group node is not active, modifying the first target failover group node to be active, and adding the physical volume to the second target failover group node.

2. The multi-path failover group management method according to claim 1, wherein when the port group information corresponding to the storage array subscript value is inconsistent with the target port group information, the method comprises:
    looking up a failover group linked list corresponding to the storage array subscript value;
    determining whether a first target failover group node whose target physical link information is consistent with the physical link information exists in the failover group linked list; and
    when the first target failover group node whose target physical link information is consistent with the physical link information exists in the failover group linked list, adding the physical volume to the first target failover group node.

3. The multi-path failover group management method according to claim 1, wherein after creating the failover group node according to the physical link information, the method comprises:

adding the failover group node to the failover group linked list corresponding to the storage array subscript value.

4. The multi-path failover group management method according to claim 1, wherein the updating the storage array subscript value and returning S3 comprises:
adding one to the storage array subscript value as the updated storage array subscript value, and returning S3.

5. The multi-path failover group management method according to claim 1, wherein determining target port group information of a storage to which the physical volume belongs comprises:
acquiring the corresponding target port group information according to a connection port of the physical volume.

6. The multi-path failover group management method according to claim 1, wherein the storage array subscript value is configured to find the corresponding port group information.

7. The multi-path failover group management method according to claim 1, wherein determining whether port group information corresponding to a storage array subscript value is null comprises:
determining whether port group information corresponding to an initial value of the storage array subscript value is null.

8. The multi-path failover group management method according to claim 7, wherein the initial value is zero.

9. The multi-path failover group management method according to claim 7, wherein the initial value is one.

10. The multi-path failover group management method according to claim 1, wherein the updating the storage array subscript value and returning S3 comprises:
adding two to the storage array subscript value as the updated storage array subscript value, and returning S3.

11. The multi-path failover group management method according to claim 1, wherein the updating the storage array subscript value and returning S3 comprises:
adding an integer to the storage array subscript value as the updated storage array subscript value, and returning S3.

12. The multi-path failover group management method according to claim 1, wherein the failover group node to which the physical volume is added is an existing failover group node or a new failover group node.

13. The multi-path failover group management method according to claim 2, the method comprises:
performing state detection on the failover group node before adding the physical volume to the first target failover group node.

14. The multi-path failover group management method according to claim 7, wherein when the state of the first target failover group is deleted, the first target failover group node is modified to be active.

15. The multi-path failover group management method according to claim 1, the method comprises:
ensuring that the first target failover group node is active before adding the physical volume to the second target failover group node.

16. The multi-path failover group management method according to claim 1, the method comprises:
for all existing and new failover group nodes, performing state detection on the failover group node before the physical volume is added.

* * * * *